(12) United States Patent
Mäder et al.

(10) Patent No.: US 8,035,680 B2
(45) Date of Patent: Oct. 11, 2011

(54) PANORAMIC VIEWING SYSTEM ESPECIALLY IN COMBAT VEHICLES

(75) Inventors: Urban Mäder, Zurich (CH); Michael Gerber, Zurich (CH); Roman Widmer, Zurich (CH)

(73) Assignee: Rheinmetall Air Defence AG, Zurich (CH)

( * ) Notice: Subject to any disclaimer, the term of this patent is extended or adjusted under 35 U.S.C. 154(b) by 1364 days.

(21) Appl. No.: 11/600,557

(22) Filed: Nov. 16, 2006

(65) Prior Publication Data

US 2007/0273757 A1 Nov. 29, 2007

(30) Foreign Application Priority Data

Jan. 24, 2006 (DE) .......................... 10 2006 003 524

(51) Int. Cl.
*G02B 17/10* (2006.01)
(52) U.S. Cl. ................ 348/36; 348/37; 348/39; 348/47; 348/48; 359/725; 359/726
(58) Field of Classification Search ............ 348/36, 348/37, 38, 39; 359/725, 726
See application file for complete search history.

(56) References Cited

U.S. PATENT DOCUMENTS

| | | | |
|---|---|---|---|
| 6,346,950 B1 | 2/2002 | Jouppi | |
| 6,480,175 B1 | 11/2002 | Schneider | |
| 6,714,213 B1 * | 3/2004 | Lithicum et al. | 715/701 |
| 6,736,515 B2 * | 5/2004 | Hara | 348/E13.029 |
| 7,688,376 B2 * | 3/2010 | Kondo et al. | 348/340 |
| 2002/0063709 A1 | 5/2002 | Gilbert et al. | |
| 2003/0020883 A1 * | 1/2003 | Hara | 353/31 |
| 2004/0156117 A1 * | 8/2004 | Takaura et al. | 359/651 |
| 2005/0248972 A1 * | 11/2005 | Kondo et al. | 365/125 |
| 2005/0252367 A1 | 11/2005 | Jilg et al. | |

FOREIGN PATENT DOCUMENTS

| | | |
|---|---|---|
| DE | 10217177 | 10/2003 |
| EP | 0610863 | 8/1994 |
| EP | 1 161 094 | 12/2001 |
| WO | WO 95/33340 | 12/1995 |
| WO | WO 2005/124694 | 12/2005 |

* cited by examiner

*Primary Examiner* — Quang N. Nguyen

(74) *Attorney, Agent, or Firm* — Lucas & Mercanti, LLP; Klaus P. Stoffel

(57) ABSTRACT

Digital data acquired from individual cameras and images converted to digitized images are projected onto virtual 3D screens, which can be generated by a computer. This can be realized by way of 3D-accelerated hardware. The images are not, however, projected in 3D. The virtual 3D scenario with the current camera images is projected and presented to the users in 2D. This process makes it possible to use simple cameras ($2_n$) with single lenses. There is no need to use cameras with zoom technology.

8 Claims, 3 Drawing Sheets

PANORAMIC VIEWING SYSTEM ESPECIALLY IN COMBAT VEHICLES

BACKGROUND OF THE INVENTION

The invention pertains to a panoramic viewing system especially in a combat vehicle.

A panoramic viewing system is described in, for example, DE 102 17 177 A1. This direct view system with glass lenses is designed as a panoramic viewing device.

A panoramic viewing system of the applicant is described in detail in Jane's "International Defense Review" of Aug. 1, 2004. This system, which was introduced at an exhibition in Paris, comprises eight commercial cameras with 1 megapixel outputs. The cameras themselves can zoom into the areas which they cover. By means of a computer mouse, the operator can also look at images in the rear without having to turn his head in that direction. In this case, for example, digitally superimposed signatures tell the operator what direction he is looking in at the time. Digital correction, as briefly mentioned, is used to improve the transition when the operator switches his view from one camera to another. No further discussion of the panoramic viewing system is provided.

The company called "United Defense" also offers a panoramic viewing system, which it calls the "Enhanced Situational Awareness System—Eagle Vision™", and which covers a 360° horizontal range. A display is located in the helmet of the operator.

At the Internet site www.octec.com/image processing products/functionality/-mosaic.html, a process is presented by means of which it is possible to connect individual digital images of an individual sensor to each other in such a way that a complete image in the form of a panoramic display is created. No overlaps are visible.

A panoramic monitoring system with a stationary camera is described in DE 694 29 028 T2 (EP 0 610 863 B1), where the device and also an algorithm for transforming individual visual or viewing fields with distorted perspective into several normal images with undistorted perspective are discussed. The device comprises means for controlling the omnidirectional view and for digitizing an incoming or previously recorded video signal, etc.

SUMMARY OF THE INVENTION

Building on the known viewing systems, the invention proposes to accomplish the task of providing a process by means of which a panoramic image generated from individual images supplied by several different cameras can be made available to the operator.

The invention is based on the idea of using simple 2D cameras to make a quasi- or effectively 3D panoramic view available to the operator, where the operator can zoom into the section of the panoramic view which he is viewing at the moment. Overlaps between the images are also avoided.

To implement this idea, it is proposed that the digital data acquired by the individual cameras and images converted to digitized images be projected onto virtual 3D screens (which can be realized virtually by means of 3D-accelerated hardware) but not actually presented in 3D. So that no special hardware has to be developed for this purpose, the invention proposes the use of the 3D technology of graphics cards. The virtual 3D scenario (screens with the current camera images) is thus projected and presented to the user in 2D. This process makes it possible to use simple cameras with single lenses. There is no need for cameras with a zoom function.

The images supplied by the lenses are first compensated by a computer algorithm to remove distortion. As a result, good match-up is obtained between the images which overlap and must be merged.

To prevent the overlaps of the individual images from being visible and thus to offer the best-possible panoramic display (uniform image), the so-called "alignment" of the virtually unrolled screens (=cameras) is read in first. A light beam is then sent through each pixel of each screen and a check is run to see whether this beam also passes through another screen. If it does not, the intensity of this pixel is set at 100%. If it does, the intensity of the pixels on the two screens is adjusted in such a way that the total intensity of the two pixels on the two screens is 100%. This creates a smooth transition. The intensity at the overlaps between screens is therefore always adjusted to 100%. The result is then stored in a table.

The panoramic viewing system should preferably consist of eight cameras covering a range of 360° in the horizontal direction. A computer unit joins the images from these cameras into a seamless panorama in real time. The operators can choose any desired individual sections. A display or the display is attached preferably to the operator's helmet. Together with a motion sensor, which tracks the position of the helmet, this forms a human-machine interface.

In another embodiment of the invention, it is provided that several different image sections can be offered simultaneously to several different users.

The precise alignment of the cameras with each other is also implemented in software. The alignment process is automated by means of a correlation method.

By the use of an external reference system (position measurement), the image made available to the operator can also be stabilized. The stabilization itself is performed in the computer; there is no need to stabilize the cameras. The reference axis (usually the longitudinal axis of the vehicle) can be adjusted by pushing a button.

By means of various alignments (=orientation of the camera), the matching (and brightness) can be controlled, so that the matchings are optimal in the short, medium, and long ranges.

For display in the short, medium, and long ranges, it is provided in accordance with an embodiment of the invention that the operator can zoom in digitally on the image in the monitor; the camera lens itself does not move. Each operator, independently of the other, can choose a different image section and zoom in on it as desired. To zoom, the operator uses his computer mouse, joystick, keyboard, etc., to move into the image and to enlarge it, which occurs as soon as zooming starts. The same operating elements are also used for the general control of the system.

The advantage of this invention is therefore that several camera images with overlapping view areas can be merged. In addition, the system can be used simultaneously by several operators looking in different directions. The alignment of the stationary cameras with respect to each other is measured automatically by a correlation method. In addition, only one alignment needs to be selected for various view areas. Another advantage is that the data are processed in the same way even if different cameras and different lenses are being used. The configuration of the cameras can be easily managed, and their number can be quickly changed and/or adapted. The failure of one camera or frame grabber does not lead to the total failure of the system; only one sector is lost.

The system is not limited to panoramic views. By arranging the cameras appropriately, any conceivable area can be covered and the images merged.

A system is therefore offered which is characterized by a seamless 360° panorama in real time, in which any desired section of the image can be realized (angle, zoom position) individually, and several different image sections can be made available simultaneously to several users. The desired sections of the image or the entire panorama can be transmitted over standardized links to higher-level and/or adjacent guidance systems. Vital additional information such as messages from a Battle Management System, warnings, target information, etc, can be offered by superimposition.

Color and/or black-and-white camera images from several cameras, which can be installed in fixed positions, can be processed. The images in question are usually digital.

This panoramic view (360°) or partial view (less than 360°) can be used not only for driving, either forward or in reverse, and for applications on ships and aircraft, including helicopters, but also for monitoring purposes such as entryway monitoring, store monitoring, vehicles for transporting currency, etc.

BRIEF DESCRIPTION OF THE DRAWINGS

The invention is to be explained in greater detail below on the basis of an exemplary embodiment and the associated drawing.

DESCRIPTION OF THE INVENTION

Figure 1:
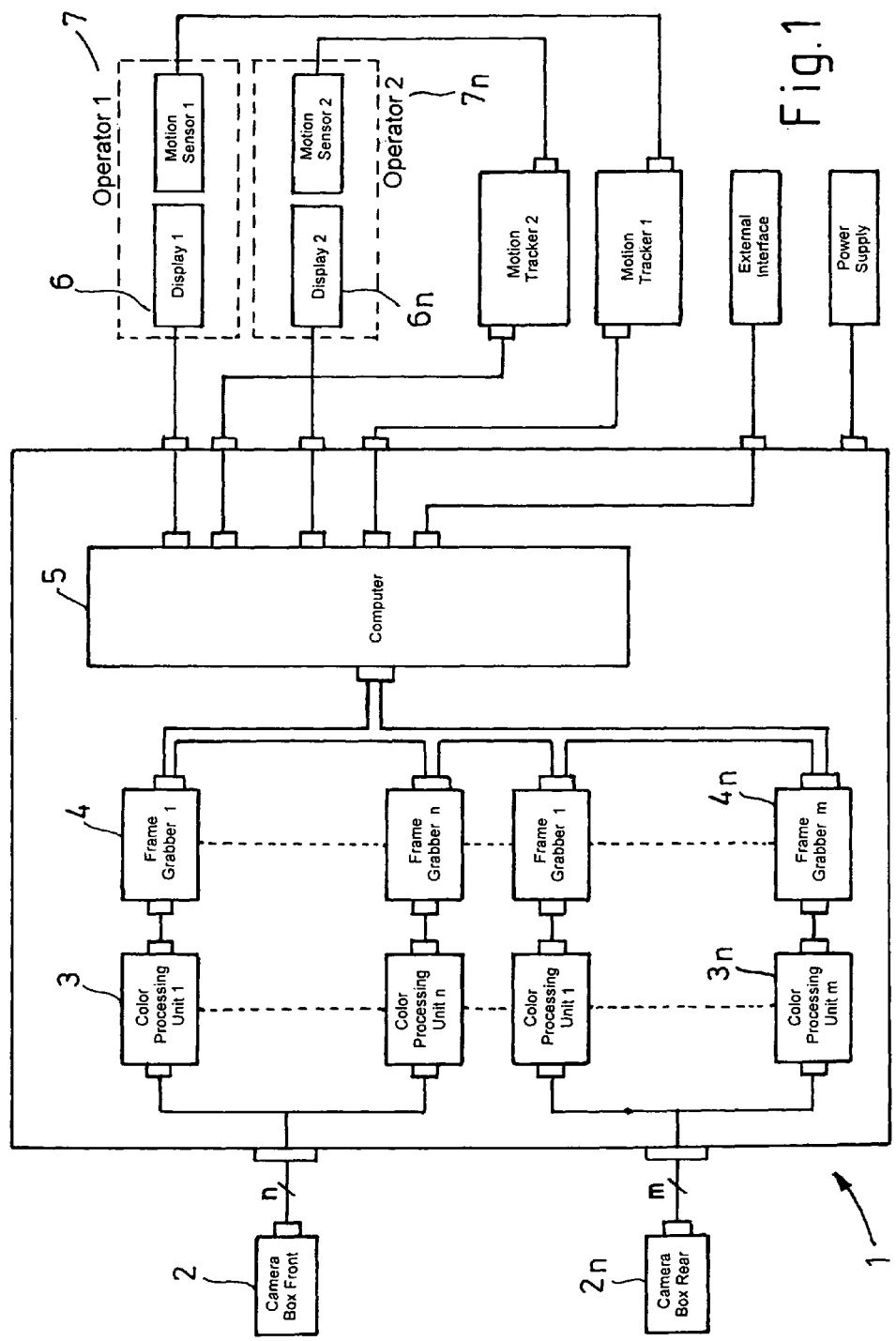
FIG. 1 shows a general block circuit diagram of the system.
Figure 2:
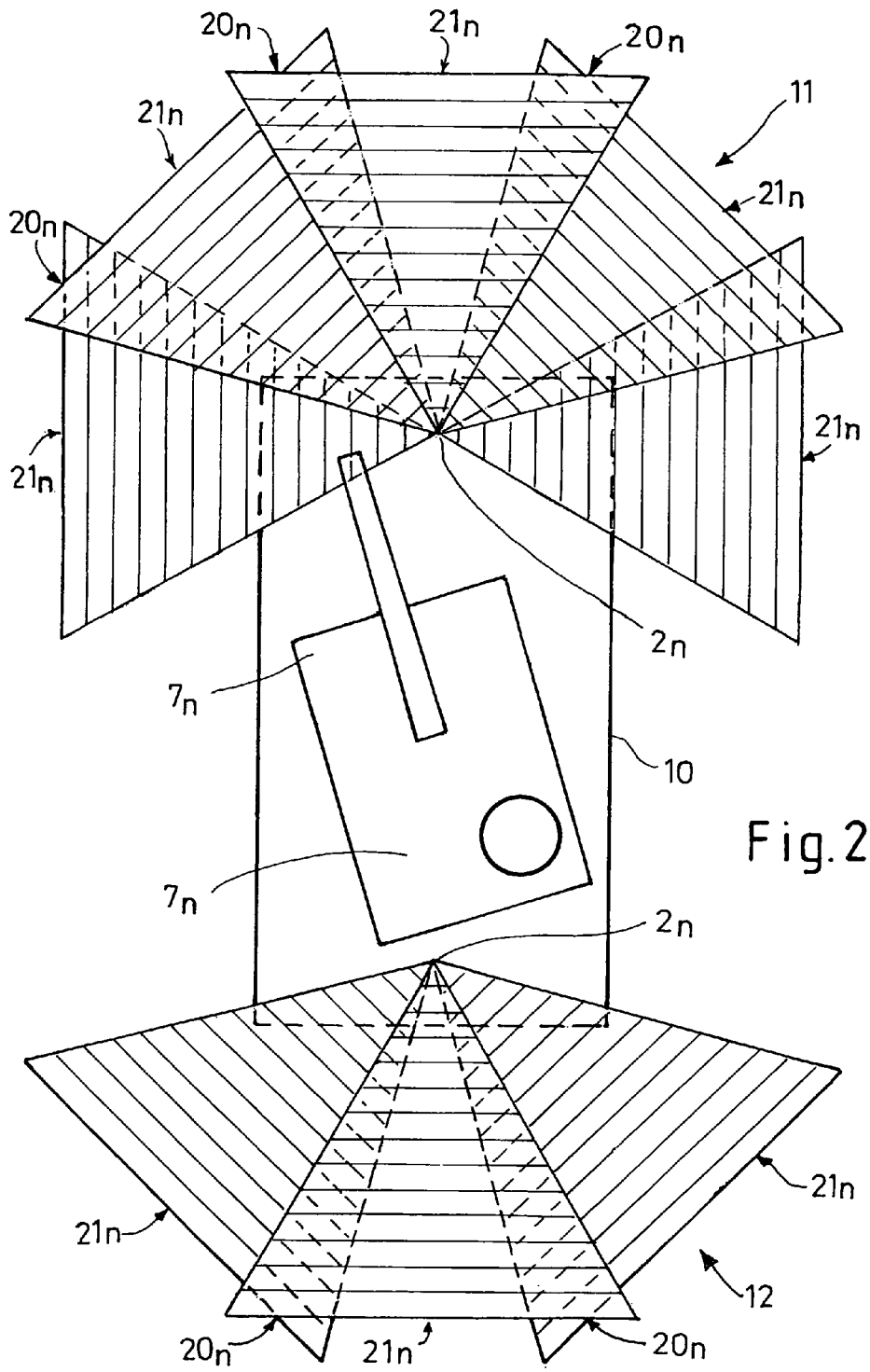
FIG. 2 shows a possible arrangement of the cameras on a carrier.
Figure 3:
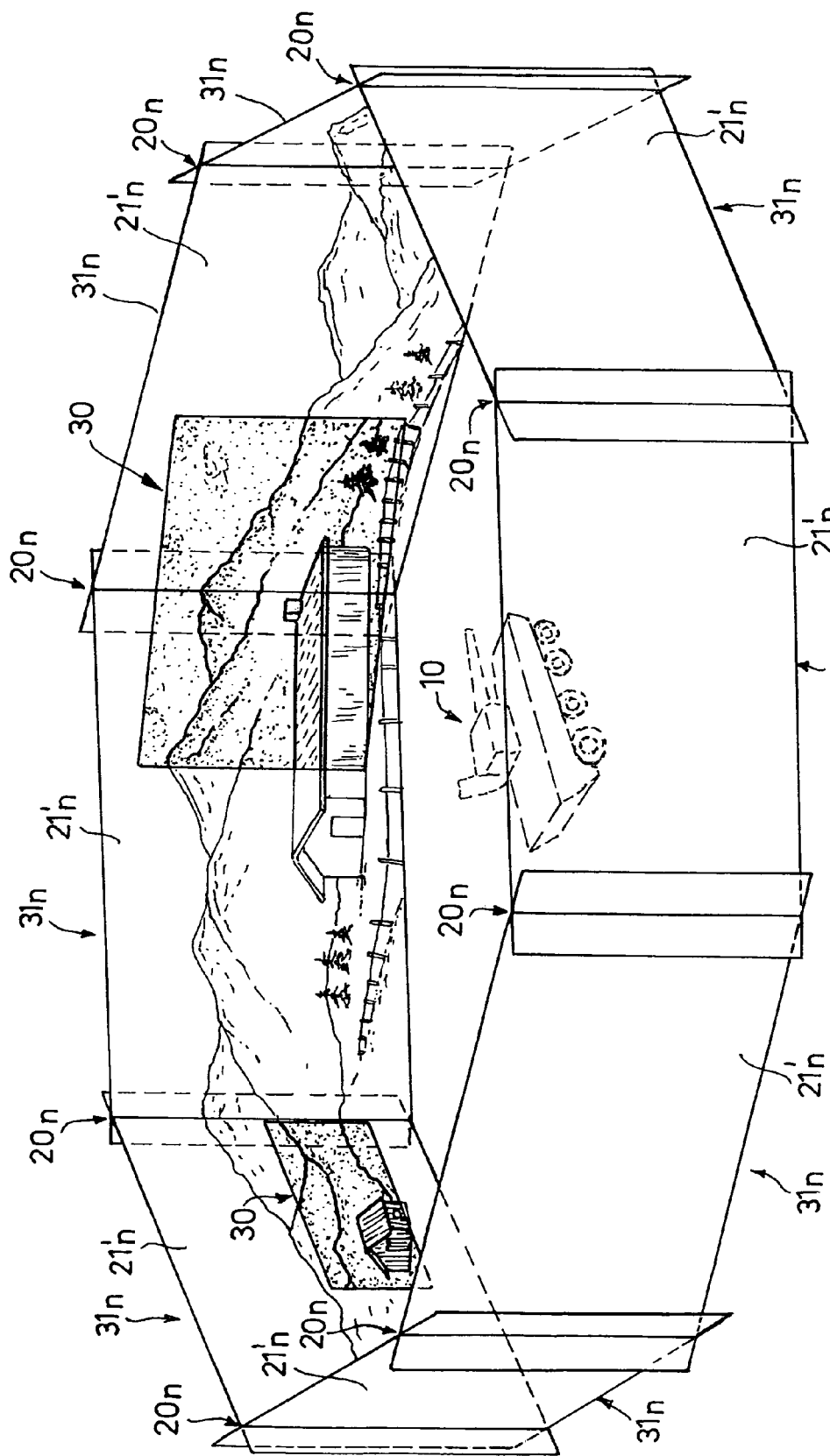
FIG. 3 shows part of a panoramic view diagram.

FIG. 1 shows a functional block diagram of a possible embodiment of the system 1, with several cameras $2_n$, which are mounted in the forward area 11 and also in the rear area 12 of a carrier 10 such as a vehicle or other object (FIG. 2). Image-generating circuits or color processing units $3_n$ are connected to the cameras $2_n$; the image-generating circuits are connected to associated frame grabbers $4_n$, which take the images from the cameras 2 and make them available to a computer 5 on demand over a bus. The outputs of these grabbers $4_n$ are sent to the computer 5, which for its own part has additional inputs and several outputs, which are connected, for example, to the individual displays $6_n$ of the individual operators $7_n$ (not shown). The computer 5, including its graphics card, has the task of realizing the quasi-3D panoramic image 30 (FIG. 3).

FIG. 2 shows the overlaps $20_n$ between the images $21_n$ recorded by the cameras $2_n$. These are reflected in the panoramic diagram 30 according to FIG. 3.

The process for displaying the view of the panoramic image 30 (here a 360° view, although this is not a necessary condition) takes place as follows:

All of the camera images $21_n$ are read in from the various frame grabbers $4_n$. The computer 5 establishes the direction (camera $2_n$) in which the user 7 wants to look and determines the camera $2_n$ required for the view and the data or section to be obtained from that camera. It is assumed that the computer 5 knows the arrangement of the cameras $2_n$ and that the computer 5 obtains the information concerning the viewing direction of the user via an HMI (Human-Machine Interface). On the basis of this information, the image data are now calculated for the user. For this purpose, the data are sent over the bus from the appropriate grabbers $4_n$ to the computer 5. If the images $21_n$ have become distorted because of the use of single lenses, the distortion is removed by means of conventional software.

In an intermediate step, the intensity of the images $21_n$ in the overlapping areas $20_n$ is adjusted (to a so-called alpha value, as will be explained below) in order to produce clean transitions, where values stored for this purpose in a relevant table are used. Although the images $21'_n$ thus created are projected onto 3D screens $31_n$ (running virtually on 3D-accelerated hardware in the computer 5), the result is not displayed in 3D. The 3D scenery (screens $31_n$ with the current camera images $21_n$) is projected and displayed to the user in 2D. If the user wants, he can zoom into this scenery. This is done in the conventional manner.

If the HMI (Human-Machine Interface) establishes that a certain user 7 has changed the direction in which he is looking, the previously described process is run through again as required.

According to an elaboration of the previously described process, an additional correction process by means of which the alpha values can be determined and stored in the computer 5 is run to cut out or correct these views.

The correction process and the process for displaying the view proceed approximately as follows:

Before the system is started, a so-called alpha file is preferably generated. In the first step, the alignment of the screens $31_n$ (=cameras $2_n$) is read in (alignment). A light beam is sent through each pixel of each screen $31_n$, and it is determined whether this beam also passes through another screen $31_n$. If it does not, the intensity is set to 100%. If it does, however, the intensity of the two screens $31_n$ is adjusted in such a way that that the sum of the intensities of the two screens $31_n$ is 100% and a smooth transition is obtained. The intensities which have been determined and adjusted for the overlaps $20_n$ of two or more screens $31_n$ are stored or filed in a table in a memory unit of the computer 5. During the run time, various alpha files can be loaded to achieve optimal overlap ($20_n$) in the short, medium, and long ranges.

As previously mentioned, the system 1 is characterized in that different individual views can be provided simultaneously to several different users $7_n$.

The view for the user 7 is preferably provided on a display (not shown) which can be attached to a helmet in the manner known in and of itself. Together with a motion sensor, which detects the position of the helmet, a user-friendly MMI (Machine-Machine Interface) interface is thus obtained. The operator $7_n$ has the impression of being able to look through the walls of the object 10. If the object 10 is a combat vehicle or the like, the viewing direction of the commander forms the basis for short-range targeting assignments.

Other features and advantages of the present invention will become apparent from the following description of the invention that refers to the accompanying drawings.

The invention claimed is:

1. A panoramic viewing system, comprising:
several cameras, which are distributed over an object to record scenarios around the object;
a computer connected to the cameras and to which all camera images of the cameras are sent, the camera images being processed in the computer and presented to at least one operator for viewing;
image-generating circuits, the cameras being connected to the image-generating circuits;
associated frame grabbers connected to the image-generating circuits, the associated frame grabbers having outputs connected to the computer, the computer having several outputs;
at least one display for the at least one operator of the panoramic viewing system, the computer outputs being connected to the display, wherein images are projected onto virtual 3D screens, which are made available in 2D as a quasi-3D panoramic image to the at least one operator; and a so-called alpha file is generated before the system is started, for which purpose, in a first step, an alignment of the virtual screens is read into the computer; an imaginary light beam is sent through each pixel of each screen and it is determined whether this beam also passes through another screen, where, if it does not, the intensity is set to 100%, whereas, if it does, the intensity of the screens in question are adjusted so that a sum of the intensities of the two screens in question is 100% and these determined and adjusted intensities are stored or filed in a table in a memory unit of the computer.

2. The panoramic viewing system according to claim 1, wherein several cameras are installed in a forward area and also in a rear area of the object.

3. The panoramic viewing system according to claim 1, wherein the system is configured so that several operators can simultaneously access the system, and each can be offered a quasi-3D panoramic image different from those being viewed by the other operators.

4. The panoramic viewing system according to claim 1, wherein the display is attached to a helmet of the operator and is functionally connected to a motion sensor, which detects position of the helmet and tracks viewing direction of the operator.

5. The panoramic viewing system according to claim 1, wherein the object is a land vehicle, a watercraft, an aircraft or a building.

6. A process for presenting scenarios occurring around an object, comprising the steps of:

recording the scenarios with cameras mounted on the object;

processing the scenarios in a computer; and offering the scenarios to an operator as a panoramic image;

the process further including reading all camera images of the cameras into associated frame grabbers and making the camera images available to the computer, the processing including the computer establishing a direction in which the operator in question wants to look and determining the camera required to present that view and the data or section to be obtained from that camera, the computer then having the data sent to it from the appropriate associated frame grabbers, and projecting these camera images in 2D onto virtual 3D screens in the computer, and presenting them to the operator in question for viewing; and the process further including generating a so-called alpha file before the system is started, for which purpose, in a first step, an alignment of the virtual screens is read into the computer; an imaginary light beam is sent through each pixel of each screen and it is determined whether this beam also passes through another screen, where, if it does not, the intensity is set to 100%, whereas, if it does, the intensity of the screens in question are adjusted so that a sum of the intensities of the two screens in question is 100% and these determined and adjusted intensities are stored or filed in a table in a memory unit of the computer.

7. The process according to claim 6, wherein the individual operator in question can zoom in on the displayed scenery.

8. The process according to claim 6, wherein while the system is running, various alpha files are loaded to achieve optimal overlap in short, medium, and long ranges.

* * * * *